United States Patent
Zhang et al.

(10) Patent No.: US 12,299,845 B1
(45) Date of Patent: May 13, 2025

(54) FACE IMAGE RESTORATION METHOD BASED ON STATE SPACE MODEL

(71) Applicant: NANJING UNIVERSITY OF POSTS AND TELECOMMUNICATIONS, Nanjing (CN)

(72) Inventors: Dengyin Zhang, Nanjing (CN); Fan Gao, Nanjing (CN); Weidan Yan, Nanjing (CN); Qunjian Du, Nanjing (CN)

( * ) Notice: Subject to any disclaimer, the term of this patent is extended or adjusted under 35 U.S.C. 154(b) by 0 days.

(21) Appl. No.: 18/930,208

(22) Filed: Oct. 29, 2024

Related U.S. Application Data

(63) Continuation of application No. PCT/CN2024/120396, filed on Sep. 23, 2024.

(30) Foreign Application Priority Data

May 6, 2024 (CN) .......................... 202410544518.5

(51) Int. Cl.
*G06T 5/60* (2024.01)
*G06T 3/4046* (2024.01)
*G06T 5/50* (2006.01)

(52) U.S. Cl.
CPC .............. *G06T 5/60* (2024.01); *G06T 3/4046* (2013.01); *G06T 5/50* (2013.01);
(Continued)

(58) Field of Classification Search
None
See application file for complete search history.

(56) References Cited

U.S. PATENT DOCUMENTS 8,280,180 B2 * 10/2012 Banner ..................... G06T 5/70
348/208.4
11,165,992 B1 * 11/2021 Ong ........................ G06V 10/82
(Continued)

FOREIGN PATENT DOCUMENTS

CN 103514589 A 1/2014
CN 105874775 A 8/2016
(Continued)

OTHER PUBLICATIONS

Han Huihui, et al. <Semantic segmentation of encoder-decoder structure>, <Journal of image and graphics>, Feb. 16, 2020, entire document.

(Continued)

*Primary Examiner* — Jiangeng Sun

(57) ABSTRACT

The present application discloses a face image restoration method based on a state space model, which includes inputting the to-be-restored face image to a restoration model to obtain a restored face image; the restoration model includes an encoder and a decoder; the encoder sequentially includes a first image fusion module, a first multi-scale state space module, a second image fusion module, a second multi-scale state space module, a third image fusion module, and a third multi-scale state space module; the decoder sequentially includes a fourth multi-scale state space module, a first multi-scale attention fusion module, a fifth multi-scale state space module, a second multi-scale attention fusion module, a sixth multi-scale state space module, and a third multi-scale attention fusion module. This method ensures the consistency of face semantic information while restoring the detailed texture, especially low quality face images in real degraded scenes can achieve better restoration results.

9 Claims, 7 Drawing Sheets

(52) U.S. Cl.
CPC ............... *G06T 2207/20016* (2013.01); *G06T 2207/20081* (2013.01); *G06T 2207/20084* (2013.01); *G06T 2207/20221* (2013.01); *G06T 2207/30201* (2013.01)

(56) References Cited

U.S. PATENT DOCUMENTS

| | | | |
|---|---|---|---|
| 11,657,598 B1 * | 5/2023 | Suresh | G06V 10/26 382/157 |
| 2010/0246952 A1 | 9/2010 | Banner et al. | |

FOREIGN PATENT DOCUMENTS

| | | | | | |
|---|---|---|---|---|---|
| CN | 112750082 A | * | 5/2021 | ......... | G06K 9/00268 |
| CN | 114419449 A | * | 4/2022 | | |
| CN | 114707227 A | | 7/2022 | | |
| CN | 116416434 A | * | 7/2023 | | |
| CN | 116664435 A | | 8/2023 | | |
| CN | 116739946 A | | 9/2023 | | |
| CN | 117391995 A | * | 1/2024 | ........... | G06N 3/0455 |
| CN | 117710251 A | * | 3/2024 | | |
| CN | 118097363 A | * | 5/2024 | ........... | G06V 10/806 |
| CN | 118298047 A | * | 7/2024 | | |
| CN | 118396859 A | | 7/2024 | | |
| WO | WO-2015115018 A1 | * | 8/2015 | ............... | G06T 1/20 |
| WO | 2022110638 A1 | | 6/2022 | | |

OTHER PUBLICATIONS

Rui Deng, at el., "CU-Mamba: Selective State Space Models with Channel Learning for Image Restoration", larXiv:2404.11778v1 [cs.CV], Apr. 17, 2024, Full text.

Yuan Shi, at el., "VmambaIR: Visual State Space Model for Image Restoration", arXiv:2403.11423v1, Mar. 18, 2024, Full text.

Xiaoming Li, at el., "Learning Dual Memory Dictionaries for blind Face Restoration", IEEE Transactions on Pattern Analysis and Machine Intelligence, May 31, 2023, Full text.

* cited by examiner

FACE IMAGE RESTORATION METHOD BASED ON STATE SPACE MODEL

CROSS-REFERENCE TO RELATED APPLICATIONS

The present application claims priority to Chinese Patent Application No. 202410544518.5, filed May 6, 2024, the entire disclosure of which is incorporated herein by reference.

TECHNICAL FIELD

The present application relates to a face image restoration method based on a state space model and belongs to the field of image processing technology.

BACKGROUND

In audio-visual entertainment, security monitoring and other scenarios, high quality and clear face images not only provide users with a good visual sense, but also help law enforcement officers to search for suspects, missing persons and other work. Due to the shooting conditions there are many unstable factors, such as imaging equipment focus failure, camera shake; imaging environment of low light, high exposure, shooting object movement interference; channel transmission lossy compression, code format, etc., will lead to multiple interferences in the image triggered by different degrees of degradation. The effective identity information provided by indistinguishable low-quality face images is very limited. Therefore, face image restoration aims to recover clear and high quality face images from degraded low quality face images, which helps to improve the robustness of downstream tasks, such as, face super-resolution and recognition, old photo restoration, and virtual digital human image editing.

Currently, the model architectures used in face restoration methods are mainly based on convolutional neural networks (CNNs) and Transformer networks. Due to the localized nature of the convolution operation, the existing methods based on convolutional neural networks often fail to mine global information; existing Transformer network-based methods use a computationally intensive self-attention mechanism to grasp global information after dividing the image into a number of patches, with limited ability to capture pixel-level . . . detail information.

The described method has achieved some positive results in face restoration tasks, but when facing face images with larger size and more complex and severe degradation, it cannot simultaneously mine and efficiently integrate local detail information and global geometric information, resulting in a restoration performance that is difficult to meet the existing industry requirements.

SUMMARY

To overcome the deficiencies in the related art, the present application provides a face image restoration method based on a state space model.

The state space model architecture has global information mining capability compared with convolution neural network; compared with the transformer model architecture, it not only reduces computational overhead, but also has stronger temporal memory capability. The present application further introduces multi-scale technology to alleviate the problem of insufficient integration of local and global information, and to maintain the consistency of face identity information while ensuring the restoration of detailed texture and geometric contour. In the face of complex real degradation scenes, the proposed restoration method of the present application can not only achieve high index scores, such as peak signal-to-noise ratio (PSNR), but also recover clear face images with high quality.

In order to achieve the stated purpose, the present application is realized using the following technical solution.

In a first aspect, the present application discloses a face image restoration method based on a state space model, including:

obtaining a to-be-restored face image;

inputting the to-be-restored face image to the restoration model to obtain a restored face image;

the restoration model includes an encoder and a decoder;

the encoder sequentially includes a first image fusion module, a first multi-scale state space module, a second image fusion module, a second multi-scale state space module, a third image fusion module, and a third multi-scale state space module;

the to-be-restored face image is fused with a 2-fold down-sampled low quality face image by the first image fusion module, and is extracted by the first multi-scale state space module after fusion, to obtain first stage features; and the first stage features are fused with a 4-fold down-sampled low quality face image by the second image fusion module, and are extracted by the second multi-scale state space module after fusion, to obtain second stage features;

the second stage features are fused with a 8-fold down-sampled low quality face image by the third image fusion module, and are extracted by the third multi-scale state space module after fusion, to obtain third stage features;

the decoder sequentially includes a fourth multi-scale state space module, a first multi-scale attention fusion module, a fifth multi-scale state space module, a second multi-scale attention fusion module, a sixth multi-scale state space module, and a third multi-scale attention fusion module;

the third stage features are restored by the fourth multi-scale state space module to obtain a 2-fold up-sampled restored face image;

the 2-fold up-sampled restored face image is fused with the first stage features, the second stage features and the third stage features by the first multi-scale attention fusion module, to obtain a 4-fold up-sampled restored face image by the fifth multi-scale state space module;

the 4-fold up-sampled restored face image is fused with the first stage features, the second stage features and the third stage features by the second multi-scale attention fusion module, to obtain the 8-fold up-sampled restored face image by the sixth multi-scale state space module; and the 8-fold up-sampled restored face image is fused with the first stage features, the second stage features and the third stage features by the third multi-scale attention fusion module, and is decoded after fusion to align and fit with an input low quality face image, to obtain a restored high quality face image.

In some embodiment, the first multi-scale state space module, the second multi-scale state space module, the third multi-scale state space module, the fourth multi-scale state space module, the fifth multi-scale state space module and the sixth multi-scale state space module have same network structures, each of which includes a plurality of multi-scale state space models and a feature extraction unit, and each multi-scale state space model contains two state space branches, a dimension reduction unit, a first linear layer and a second linear layer, a layer normalization unit, and a dimension upgrading unit.

In some embodiment, the first image fusion module, the second image fusion module and the third image fusion module have same network structures, and each of the first image fusion module, the second image fusion module and the third image fusion module comprises a 2-fold down-sampled unit, a feature extraction unit and a channel attention unit;

low quality face images of different scales are input to be performed, by the channel attention unit, key feature fusion on shallow features mined by the feature extraction unit and deep features output by the encoder at different stages.

In some embodiment, the feature extraction unit includes a residual convolution block and an activation function;
the residual convolution block includes two convolution layers and two activation functions, a modified linear function is used as the activation function, and output features obtained after the two convolution layers extracting deeper features from input features are summed with the input features to obtain final output features;
and/or, the channel attention unit includes a dimension reduction unit, an attention mechanism operation for assigning weights to different channels, and a dimension upgrading unit.
each state space branch contains a depth-divisible convolution, a layer normalization unit, and a state space model;
an output of the first state space branch is summed with an output of the dimension reduction unit and then passes through the first linear layer and the second linear layer, respectively;
an output of the second state space branch is summed with an output of the dimension reduction unit, and then multiplied with an output of the second linear layer, added with the output of the first linear layer, and finally passes through the layer normalization unit to obtain a higher-dimensional output; and
ability to extract long sequences of deep features of the state space model is used to enhance module feature mining and learning ability.

In some embodiment, each state space model includes three linear layers, a convolution layer, two activation layers, and a selection state space model connected by residuals;
a first output branch of the fourth linear layer passes through the selection state space model, the first activation layer, the convolution layer, and the fifth linear layer in turn to obtain a first feature, and a second output branch of the fourth linear layer passes through the second activation layer and the sixth linear layer in turn to obtain a second feature, and the first feature and the second feature are connected by residuals for output;
an expression of the state space model is:

$$\begin{cases} x'(t) = Ax(t) + Bu(t) \\ y(t) = Cx(t) + Du(t) \end{cases}$$

u(t) denotes an input signal, x(t) denotes a historical state, x'(t) denotes a current state, y(t) denotes an output signal; A denotes a state transfer matrix, B is a matrix of inputs to states, C is a matrix of states to outputs, and D is a parameter of inputs to outputs.

In some embodiment, since the input data for image processing is often discrete, ordinary differential equations of the state space model are converted into discrete-time differential equations according to a bilinear transformation method by selecting a suitable discrete-time step Δt, the differential equations are:

$$\begin{cases} x_k = \overline{A}x_{k-1} + \overline{B}u_k \\ y_k = Cx_k \\ \overline{A} = (1 - \Delta t/2 \cdot A)^{-1}(I + \Delta t/2 \cdot A) \\ \overline{B} = (I - \Delta t/2 \cdot A)^{-1}\Delta t \cdot B \end{cases}$$

$x_k$ denotes a current Kth state, $u_k$ denotes a Kth discrete value of an input sequence, $x_{k-1}$ denotes a K−1th historical state, and an affection $x_k$ of a current input $\overline{B}u_k$ on a state $\overline{A}x_{k-1}$ is calculated and an output $Cx_k$ is predicted; wherein $\overline{A}$ denotes a discretized state transfer matrix, $\overline{B}$ denotes a discretized input-to-state matrix;

the state space model controls the focus on the current input by adjusting the step size Δt, thereby achieving selection forgetting or retention of the state; when Δt is increased, the model tends to focus on the current input and forget the previous state; when Δt is reduced, the model tends to retain more historical states, thereby achieving a selection state-space model.

In some embodiment, the first multi-scale attention fusion module, the second multi-scale attention fusion module, and the third multi-scale attention fusion module have same network structures, each of which includes a generalized interpolation unit, a 2-fold down-sampled unit, a local attention stage, and a global attention stage;

the first stage features, the second stage features and the third stage features output by the encoder are unified in sizes by the generalized interpolation unit, to keep consistent with a size of output features output currently by encoder at current stage which pass through the 2-fold down-sampled unit, and followed by fusion of local and global features by the local attention stage and global attention stage.

In some embodiment, the 2-fold down-sampled unit includes a pooling layer and a convolution layer, the feature extraction unit includes two residual convolution blocks and an activation function, the channel attention unit includes a dimension reduction unit, an attention mechanism and a dimension reduction unit;

the generalized interpolation unit includes an image fusion unit and a convolution layer, and the local attention stage includes two residual convolution blocks and two activation functions, and the global attention stage contains a hourglass-shaped attention fusion unit and a channel attention unit.

In some embodiment, a method of training a restoration model includes:
obtaining a training set, the training set includes a public high quality face dataset simulating a real degradation process, generating a low quality face training image to be restored and a corresponding high quality face image;
inputting the low quality face training image to be restored into the state space restoration model, performing model training and obtaining a restored face training image in an iterative process;

calculating the loss function of the restoration model based on the restored face training result and the corresponding high quality ground truth face image; and iteratively updating the training of the restoration model based on a gradient descent method until it reaches an iterative stopping condition, to obtain a trained restoration model.

In a second aspect, the present application provides a face image restoration system based on a state space model, including a processor and a storage medium;

the storage medium is used to store instructions;

the processor for operating according to the instructions to perform the method according to the first aspect.

In a third aspect, the present application provides a computer readable storage medium having a computer program stored thereon, the computer program implements the method described in the first aspect when executed by a processor.

In a fourth aspect, the present application provides a computer device, including a memory and a processor, the memory stores a computer program, the processor implements the method described in the first aspect when the computer program is executed by the processor.

In a fifth aspect, the present application provides a computer program product includes a computer program that implements the method described in the first aspect when executed by a processor.

The present application proposes a face image restoration method based on a state space model, firstly, based on an image fusion module, different scale input images are fused at different stages of the encoder, so that the image pixels and the semantic features learn from each other; secondly, a multi-scale state space model is introduced based on the traditional state space model, and the processing branches with different sensory field sizes are used to excavate the local and global information, and assist the model deep feature extraction; finally, the multi-scale attention fusion module, compared to the general connection method using jump connection coding and decoding structure, fully consider the characteristics of the encoder features at different stages, and effectively improve the learning ability of the decoder. The present application can guarantee the consistency of face identity information while ensuring the detailed texture and geometric contour of the restoration results, and further improve the generalization performance of the face restoration model in real scenes, so as to meet the needs of all kinds of face image-related tasks and applications.

DETAILED DESCRIPTION OF THE EMBODIMENTS

The present application is further described below in conjunction with the accompanying drawings. The following embodiments are only used to illustrate the technical solution of the present application more clearly, and are not to be used to limit the scope of the present application.

First Embodiment

The present application provides a face image restoration method based on a state space model, including:

obtaining a to-be-restored face image;

inputting the to-be-restored face image to the restoration model to obtain a restored face image;

the restoration model includes an encoder and a decoder;

the encoder sequentially includes a first image fusion module, a first multi-scale state space module, a second image fusion module, a second multi-scale state space module, a third image fusion module, and a third multi-scale state space module; the to-be-restored face image is fused with a 2-fold down-sampled low quality face image by the first image fusion module, and is extracted by the first multi-scale state space module after fusion, to obtain first stage features; and the first stage features are fused with a 4-fold down-sampled low quality face image by the second image fusion module, and are extracted by the second multi-scale state space module after fusion, to obtain second stage features; the second stage features are fused with a 8-fold down-sampled low quality face image by the third image fusion module, and are extracted by the third multi-scale state space module after fusion, to obtain third stage features;

the decoder sequentially includes a fourth multi-scale state space module, a first multi-scale attention fusion module, a fifth multi-scale state space module, a second multi-scale attention fusion module, a sixth multi-scale state space module, and a third multi-scale attention fusion module; the third stage features are restored by the fourth multi-scale state space module to obtain a 2-fold up-sampled restored face image; the 2-fold up-sampled restored face image is fused with the first stage features, the second stage features and the third stage features by the first multi-scale attention fusion module, to obtain a 4-fold up-sampled restored face image by the fifth multi-scale state space module; the 4-fold up-sampled restored face image is fused with the first stage features, the second stage features and the third stage features by the second multi-scale attention fusion module, to obtain the 8-fold up-sampled restored face image by the sixth multi-scale state space module; and the 8-fold up-sampled restored face image is fused with the first stage features, the second stage features and the third stage features by the third multi-scale attention fusion module, and is decoded after fusion to align and fit with an input low quality face image, to obtain a restored high quality face image.

Figure 1:
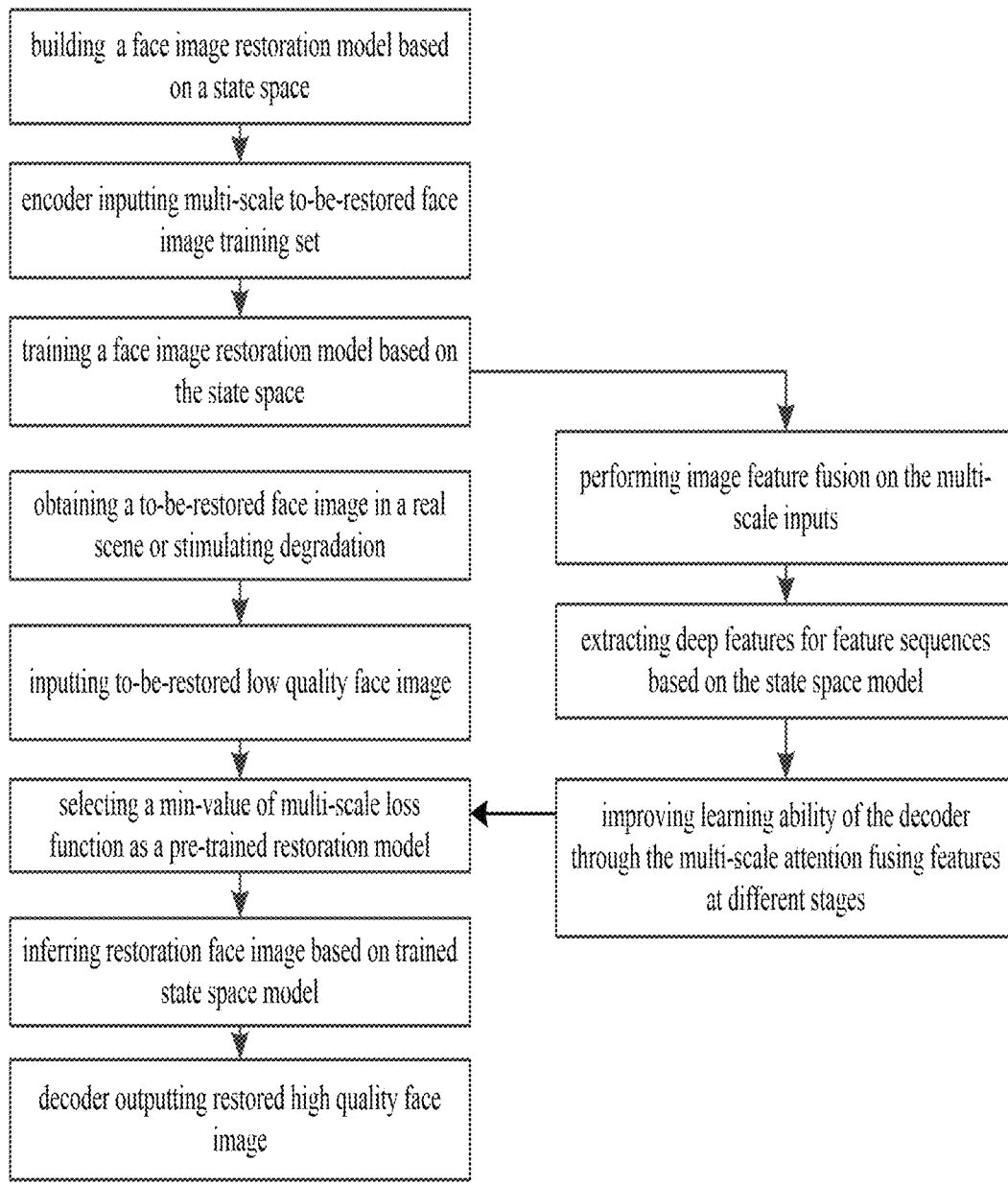
FIG. 1 is a flowchart of a face image restoration method based on a state space model provided by an embodiment of the present application.
Figure 2:
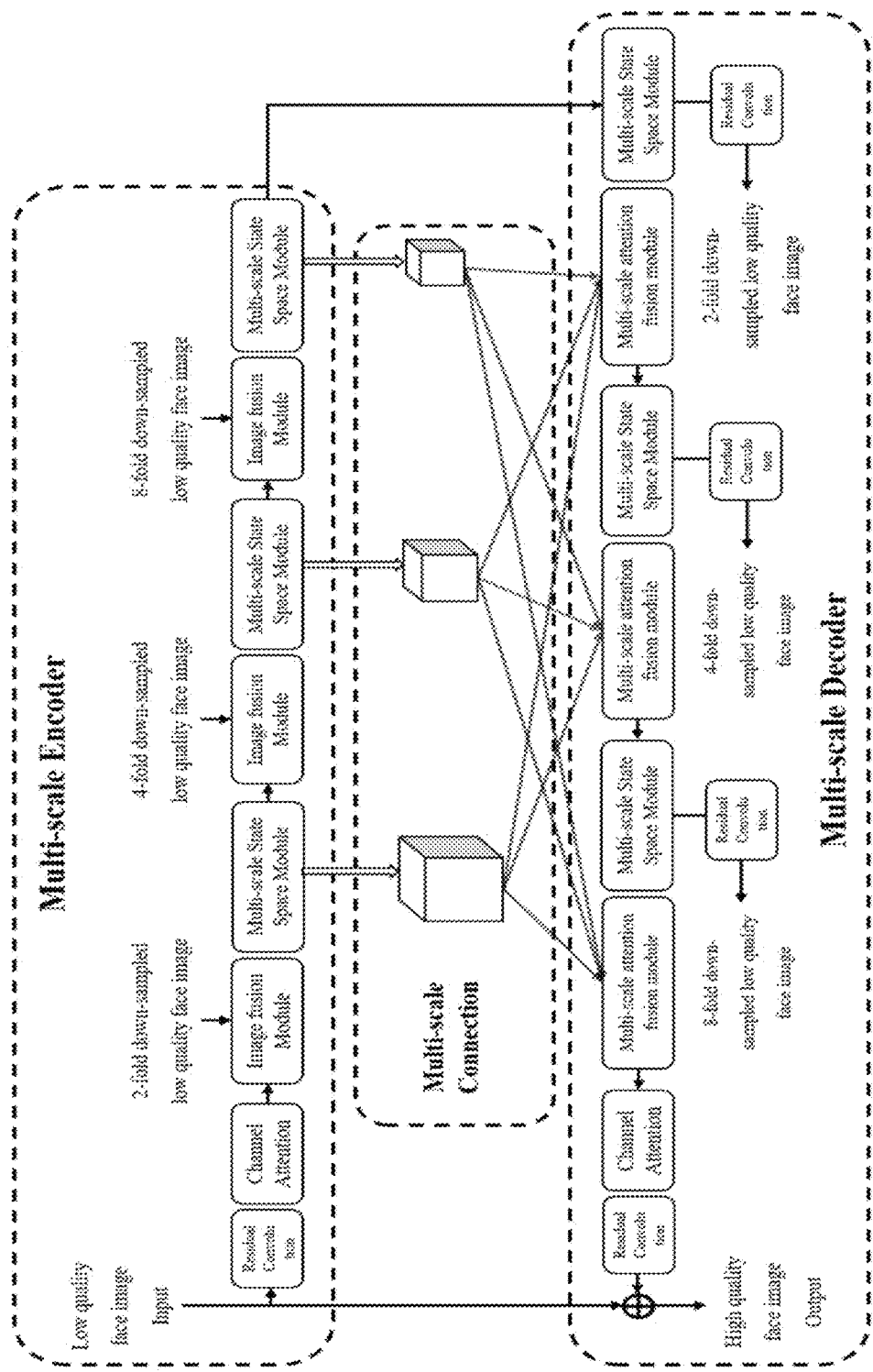
FIG. 2 is an overall structural view of the restoration model provided by the embodiment.

In some embodiment, as shown in FIG. 1 and FIG. 2, a face image restoration method based on a state space model, which includes:

obtaining a training set, generating a low quality face training image to be restored and a corresponding high quality face image, the training set includes a public high quality face dataset simulating a real degradation process;

iteratively training the restoration model using the training set to obtain a trained restoration model; and inputting a to-be-restored low quality face image generated in a real scene or by simulating a degradation process, obtaining a restored face image reasoned based on the model.

An encoder, for mining multi-scale deep semantic features based on the to-be-restored face image and its downsampled images at different scales; a decoder, for generating the restored face image based on the multi-scale deep semantic features generated by the encoder.

In the present application, an image fusion module, for inputting low quality face images of different scales to be performed, by the channel attention unit, key feature fusion on shallow features mined by the feature extraction unit and deep features output by the encoder at different stages, to promote image pixels and semantic features to learn from each other, according to a down-sampled unit, a feature extraction unit and a channel attention unit;

a multi-scale state space module, for summing an output of the first state space branch with an output of the dimension reduction unit and then passing through the first linear layer and the second linear layer, respectively;

a multi-scale attention fusion module, for mining local and global information based on processing branches with different sensory field sizes, using jump connections to enhance the learning ability of the decoder.

A technical idea of the present application is: based on an image fusion module, multi-scale input images are fused at different stages of the encoder, so that the image pixels and the semantic features learn from each other; secondly, a multi-scale state space model is introduced based on the traditional state space model, and the processing branches with different sensory field sizes are used to excavate the local and global information, and assist the model deep feature extraction; finally, the multi-scale attention fusion module, compared to the general connection method using jump connection coding and decoding structure, fully consider the characteristics of the encoder features at different stages, and effectively improve the learning ability of the decoder, thereby improving the problem that existing methods are difficult to grasp long-distance global feature information and have low inference efficiency, improving the generalization performance of the face restoration model, and achieving higher evaluation index scores and high quality visualization effects in real scenarios.

Figure 3:
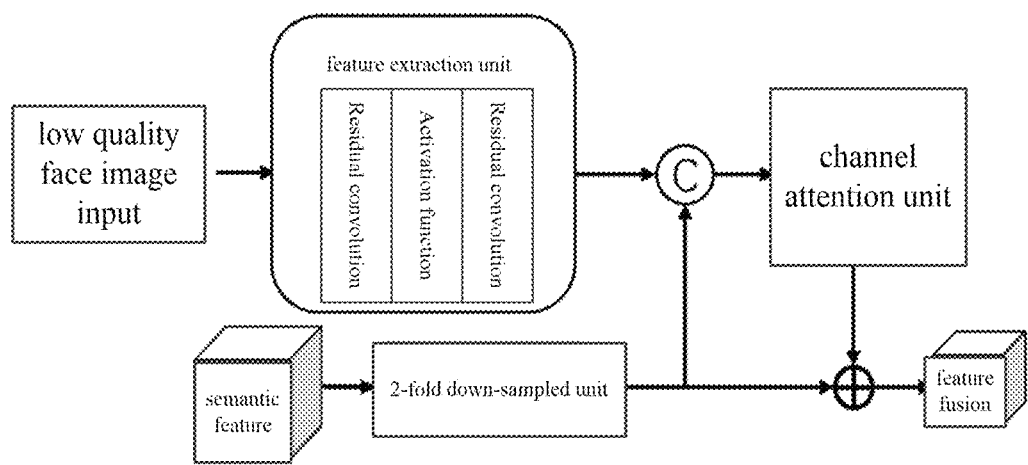
FIG. 3 is a structural view of an image fusion module provided by the embodiment.
Figure 4:
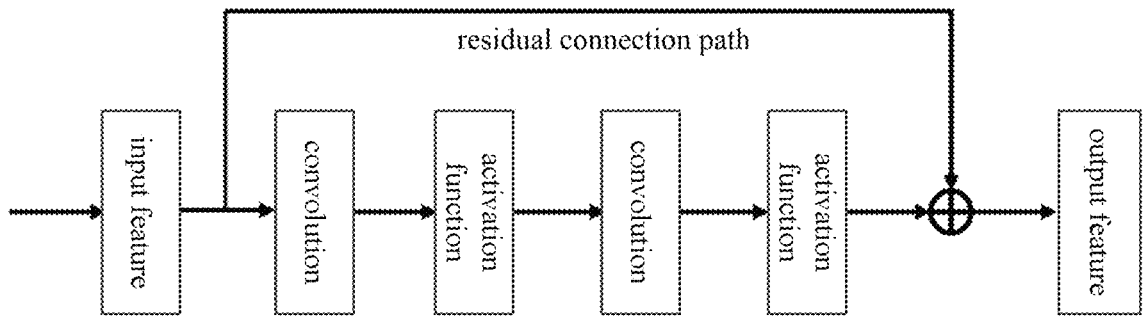
FIG. 4 is a structural view of a residual convolution block provided by the embodiments.

As shown in FIG. 3, the first image fusion module, the second image fusion module and the third image fusion module have same network structures, and each of the first image fusion module, the second image fusion module and the third image fusion module includes a 2-fold down-sampled unit, a feature extraction unit and a channel attention unit; low quality face images of different scales are input to be performed, by the channel attention unit, key feature fusion on shallow features mined by the feature extraction unit and deep features output by the encoder at different stages, to promote image pixels and semantic features to learn from each other.

Figure 5:
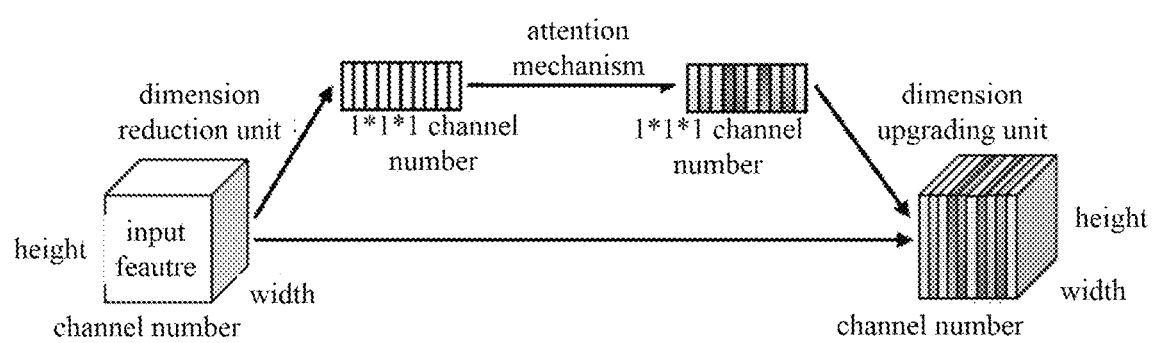
FIG. 5 is a structural view of a channel attention unit provided by the embodiment.

The feature extraction unit includes a residual convolution block and an activation function; the residual convolution block includes two convolution layers and two activation functions, a modified linear function is used as the activation function, and output features obtained after the two convolution layers extracting deeper features from input features are summed with the input features to obtain final output features;

As shown in FIG. 5, the channel attention unit includes a dimension reduction unit, an attention mechanism operation for assigning weights to different channels, and a dimension upgrading unit.

The image fusion module is used to enable image pixels and semantic features to learn from each other. Specifically, the semantic features of the low quality face image input are initially extracted based on a convolution neural network, and multi-scale fusion is utilized to efficiently combine image features from different scales.

Figure 6:
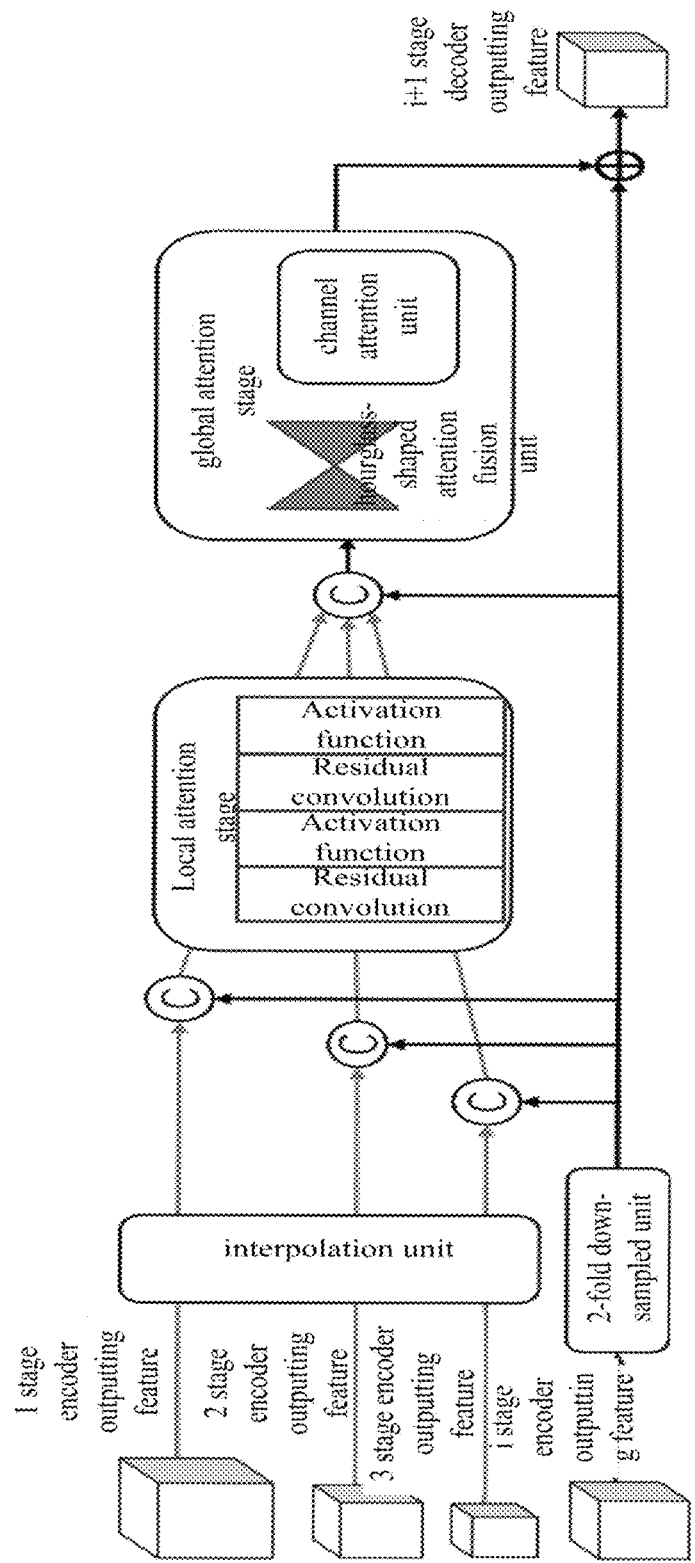
FIG. 6 is a structural view of a multi-scale attention fusion module provided by the embodiments.

In some embodiment, as shown in FIG. 6, the first multi-scale attention fusion module, the second multi-scale attention fusion module, and the third multi-scale attention fusion module have same network structures, each of which includes a generalized interpolation unit, a 2-fold down-sampled unit, a local attention stage, and a global attention stage; the first stage features, the second stage features and the third stage features output by the encoder are unified in sizes by the generalized interpolation unit, to keep consistent with a size of output features output currently by encoder at current stage which pass through the 2-fold down-sampled unit, and followed by fusion of local and global features by the local attention stage and global attention stage.

In some embodiment, the 2-fold down-sampled unit includes a pooling layer and a convolution layer, the feature extraction unit includes two residual convolution blocks and an activation function, the channel attention unit includes a dimension reduction unit, an attention mechanism and a dimension reduction unit; the generalized interpolation unit includes an image fusion unit and a convolution layer, and the local attention stage includes two residual convolution blocks and two activation functions, and the global attention stage contains a hourglass-shaped attention fusion unit and a channel attention unit.

The multi-scale attention fusion module is used to combine the low-level details of different scale features of the face image with high-level semantics. Specifically, the encoder is divided into three stages of different scales to extract the low-level semantic features of the face image, the output features of the decoder in stage i are jump-connected through the concatenation function, the local semantic features based on the residual convolution and the modified linear function (ReLU) are improved, and the global semantic features are improved based on the hourglass-shaped attention fusion mechanism of the first reduction dimensional encoding input fusion and the upgraded decoding output fusion in stages, to preserve the global important features and identity of the face image, to enhance the learning ability of the decoder, and make the restored face image more realistic.

Figure 7:
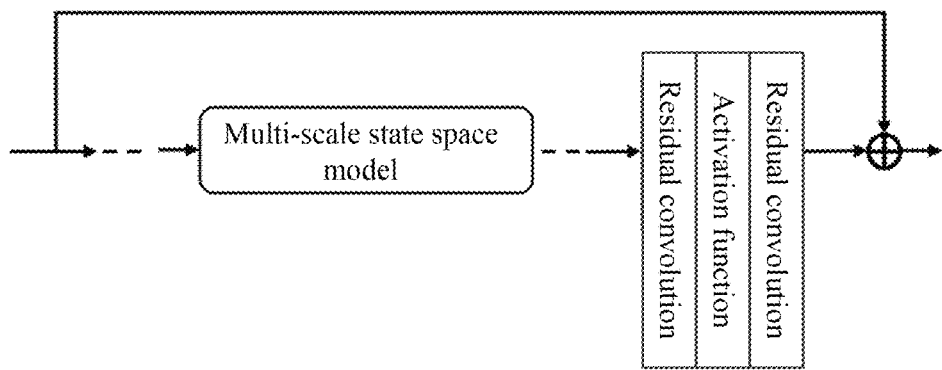
FIG. 7 is a structural view of a multi-scale state space module provided by the embodiments.

As shown in FIG. 7, the first multi-scale state space module, the second multi-scale state space module, the third multi-scale state space module, the fourth multi-scale state space module, the fifth multi-scale state space module and the sixth multi-scale state space module have same network structures, each of which includes a plurality of multi-scale state space models and a feature extraction unit. Specifically, Mining local and global information of features using multi-scale state space processing branches with different sensory field sizes to assist deep feature extraction in models.

Figure 8:
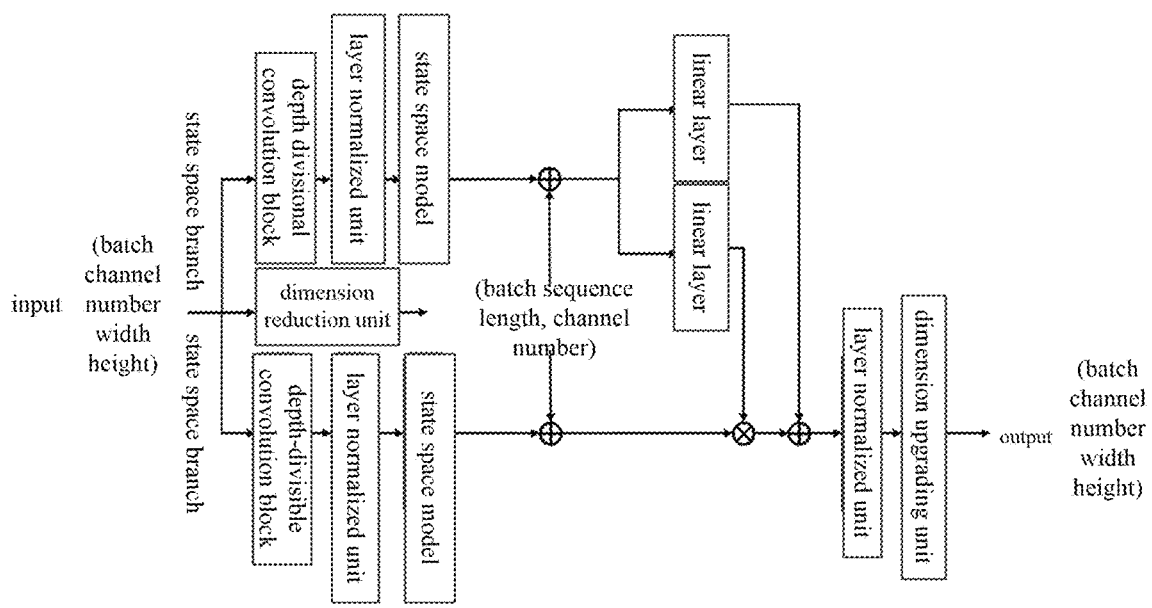
FIG. 8 is a structural view of a multi-scale state space model provided by the embodiments.

In some embodiments, as shown in FIG. 8, each multi-scale state space module includes a plurality of multi-scale state space models and a feature extraction unit, and each multi-scale state space model contains two state space branches, a dimension reduction unit, a first linear layer and a second linear layer, a layer normalization unit, and a dimension upgrading unit; each state space branch contains a depth-divisible convolution, a layer normalization unit, and a state space model; an output of the first state space branch is summed with an output of the dimension reduction unit and then passes through the first linear layer and the second linear layer, respectively; an output of the second state space branch is summed with an output of the dimension reduction unit, and then multiplied with an output of the second linear layer, added with the output of the first linear layer, and finally passes through the layer normalization unit to obtain a higher-dimensional output; and ability to extract long sequences of deep features of the state space model is used to enhance module feature mining and learning ability.

Figure 9:
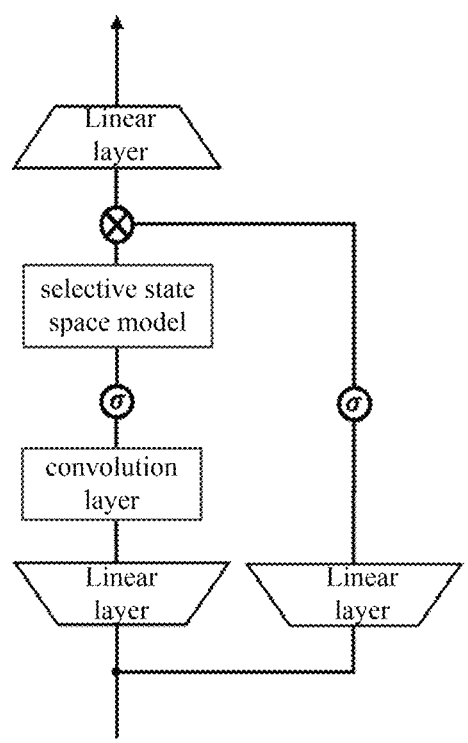
FIG. 9 is a structural view of the state space model provided by the embodiment.

As shown in FIG. 9, each state space model includes three linear layers, a convolution layer, two activation layers, and a selection state space model connected by residuals; the first output branch of the layer normalization unit passes through the third linear layer, the convolution layer, the first activation layer, and the selection state space model in sequence to obtain the first feature; the second output branch of the layer normalization unit passes through the fourth linear layer and the second activation layer in sequence to obtain the second feature; the first feature and the second feature are connected in a residual manner and then output through the fifth linear layer.

Multi-scale state space models are built on traditional state space theory, an expression of the state space model is:

$$\begin{cases} x'(t) = Ax(t) + Bu(t) \\ y(t) = Cx(t) + Du(t) \end{cases}$$

u(t) denotes an input signal, x(t) denotes a historical state, x(t) denotes a current state, y(t) denotes an output signal; A denotes a state transfer matrix, B is a matrix of inputs to states, C is a matrix of states to outputs, and D is a parameter of inputs to outputs.

since the input data for image processing is often discrete, ordinary differential equations of the state space model are converted into discrete-time differential equations according to a bilinear transformation method by selecting a suitable discrete-time step $\Delta t$, the differential equations are:

$$\begin{cases} x_k = \overline{A}x_{k-1} + \overline{B}u_k \\ y_k = Cx_k \\ \overline{A} = (1 - \Delta t/2 \cdot A)^{-1}(I + \Delta t/2 \cdot A) \\ \overline{B} = (I - \Delta t/2 \cdot A)^{-1} \Delta t \cdot B \end{cases}$$

$x_k$ denotes a current Kth state, UK denotes a Kth discrete value of an input sequence, $x_{k-1}$ denotes a K−1th historical state, and an affection $x_k$ of a current input $\overline{B}u_k$ on a state $\overline{A}x_{k-1}$ is calculated and an output $Cx_k$ is predicted; wherein A denotes a discretized state transfer matrix, B denotes a discretized input-to-state matrix;

the state space model controls the focus on the current input by adjusting the step size $\Delta t$, thereby achieving selection forgetting or retention of the state; when $\Delta t$ is increased, the model tends to focus on the current input and forget the previous state; when $\Delta t$ is reduced, the model tends to retain more historical states, thereby achieving a selection state-space model.

The feature sequence processing method based on the state space model can capture the global information over a long distance according to the selection mechanism, and compared with other feature sequence analysis models, it has greater computing throughput and model inference speed, high execution efficiency, and retains the consistency of the semantic information of the face as far as possible while guaranteeing the details and textures of the restoration results, and is able to achieve better restoration results in real scenarios.

A method of training a restoration model in the present application includes:
obtaining a training set, the training set includes a low quality face training image $I_{lq}$ to be restored and a corresponding high quality face image $I_{hq}$.

Specifically, obtaining the training set includes:
obtaining a high quality face image from a publicly available face dataset, such as the Flickr-Faces-Hight-Quality (FFHQ) high-definition face dataset; using the high quality face image as a high definition face real image $I_{hq}$.

Specifically, adjusting a pixel of the high-quality face image to obtain a degraded face image; and using the degraded face image as a face training image to be restored.

Specifically, each high quality face image is extracted from the FFHQ dataset and its aspect is adjusted to 512 pixels to obtain the degraded face image. The expression for the pixel adjustment operation is as follows:

$$I_{lq} = \{JPEG_q(I_{hg} * k_\sigma) \downarrow_s + n_\delta\} \uparrow_s;$$

$I_{lq}$ denotes the degraded face image, i.e., the face training image to be restored; $JPEG_q$ denotes JPEG compression with a compression quality of q; $I_{hq}$ denotes the high quality face image, i.e., the high definition face real image; * denotes a convolution operation; $k_\sigma$ denotes a blurring kernel of sigma=σ; $\downarrow_s$ denotes a down-sampled s-fold operation; $n_\delta$ denotes a Gaussian noise of sigma=δ; and $\uparrow_s$ denotes an up-sampled s-fold operation.

The specific parameters of the pixel adjustment operation can be adjusted according to the actual image, which are not limited here.

Second, the multi-scale down-sampled face training image $I_{lq}$ to be restored is input into the pre-constructed restoration model to obtain the multi-scale up-sampled restored face training image $\hat{I}_{hq}$.

Third, based on the restored face training image $\hat{I}_{hq}$ and the corresponding face high definition image $I_{lq}$, a loss function value L of the restoration model is calculated.

The expression of the loss function for the restoration model is as follows:

$$L = L_{l1} + \lambda_{per} L_{per} + \lambda_{adv} L_{adv}$$

L denotes the total loss function value of the restoration model; $L_{l1}$ denotes the L1 loss function value; $\lambda_{per}$ denotes the perceived loss weight, which in this embodiment takes the value of 0.1; $L_{per}$ denotes the perceived loss function value based on the VGG network; $\lambda_{adv}$ denotes the antagonistic loss weight, which in this embodiment takes the value of 0.01; and Lady denotes the antagonistic loss function value based on the antagonistic training.

The expression for the L1 loss function value $L_{l1}$ is as follows:

$$L_{l1}=\|I_{hq}-\hat{I}_{hq}\|_1$$

$I_{hq}$ denotes a collection of real images of a high definition face; $\hat{I}_{hq}$ denotes a collection of restored face training images; and $\|\cdot\|_1$ denotes an average absolute error.

The expression for the perceived loss function value $L_{per}$ based on VGG network is as follows:

$$L_{per}=|\varnothing(I_{hq})-\varnothing(\hat{I}_{hq})\|_2^2$$

ø denotes the feature maps of the 1st to 5th convolution layers in the pre-trained VGG model; $\|\cdot\|_2^2$ denotes the square of the 2-parameter number.

The expression for the adversarial loss function value $L_{adv}$ based on adversarial training is as follows:

$$L_{adv}=-E_{\hat{I}hq}\,\text{softplus}(D(\hat{I}_{hq}))$$

$D(\cdot)$ denotes the output of the discriminator in adversarial training; $E_{\hat{I}hq}$ denotes the expectation about the distribution $\hat{I}_{hq}$; softplus denotes the softplus function, which is expressed as:

$$\text{softplus}(x)=ln(1+e^x)$$

Fourth, iterative update training of the restoration model based on the gradient descent method is performed, and the restoration model with the smallest total loss function value of the restoration model is selected as the pre-trained restoration model.

Second Embodiment

Based on the first embodiment, the present embodiment provides a face image restoration system based on a state space model, which includes a processor and a storage medium; the storage medium is used to store instructions; the processor for operating according to the instructions to perform the method according to the first embodiment.

Third Embodiment

Based on the first embodiment, the present embodiment provides a computer readable storage medium having a computer program stored thereon, the computer program implements the method described in the first aspect when executed by a processor.

Fourth Embodiment

Based on the first embodiment, the present embodiment provides a computer device, including a memory and a processor, the memory stores a computer program, the processor implements the method described in the first aspect when the computer program is executed by the processor.

Fifth Embodiment

Based on the first embodiment, the present embodiment provides a computer program product, which includes a computer program that implements the method described in the first aspect when executed by a processor.

It should be appreciated by those skilled in the art that embodiments of the present application may be provided as methods, systems, or computer program products. Accordingly, the present application may take the form of a fully hardware embodiment, a fully software embodiment, or an embodiment that combines software and hardware aspects.

Further, the present application may take the form of a computer program product implemented on one or more computer-usable storage medium (including, but not limited to, a disk memory, a CD-ROM, an optical memory, etc.) that contain computer-usable program code therein.

The present application is described with reference to flowcharts and/or block diagrams of methods, devices (systems), and computer program products according to embodiments of the present application. It should be understood that each of the processes and/or boxes in the flowchart and/or block diagram, and the combination of processes and/or boxes in the flowchart and/or block diagram, may be implemented by computer program instructions. These computer program instructions may be provided to a processor of a general-purpose computer, a special-purpose computer, an embedded processor, or other programmable data-processing device to produce a machine such that the instructions executed by the processor of the computer or other programmable data-processing device produce a device for carrying out the functions specified in the one process or multiple processes of the flowchart and/or the one box or multiple boxes of the box diagram.

These computer program instructions may also be stored in computer-readable memory capable of directing the computer or other programmable data processing device to operate in a particular manner, such that the instructions stored in the computer-readable memory produce an article of manufacture comprising an instruction device that implements the function specified in the flowchart one process or a plurality of processes and/or the box diagram one box or a plurality of boxes.

These computer program instructions may also be loaded onto a computer or other programmable data processing device such that a series of operational steps are performed on the computer or other programmable device to produce computer-implemented processing, such that the instructions executed on the computer or other programmable device provide steps for implementing the functionality specified in the flowchart one process or a plurality of processes and/or the box diagram one box or a plurality of boxes.

The foregoing is only a preferred embodiment of the present application, and it should be noted that: for those skilled in the art, without departing from the principles of the present application, a number of improvements and embellishments may be made, which shall also be considered as the scope of protection of the present application.

What is claimed is:

1. A face image restoration method based on a state space model, comprising:
    obtaining a to-be-restored face image;
    inputting the to-be-restored face image to a restoration model to obtain a restored face image;
    wherein the restoration model comprises an encoder and a decoder;
    the encoder sequentially comprises a first image fusion module, a first multi-scale state space module, a second image fusion module, a second multi-scale state space module, a third image fusion module, and a third multi-scale state space module;
    wherein the to-be-restored face image is fused with a 2-fold down-sampled low quality face image by the first image fusion module, and is extracted by the first multi-scale state space module after fusion, to obtain first stage features; and
    the first stage features are fused with a 4-fold down-sampled low quality face image by the second image fusion module, and are extracted by the second multi-scale state space module after fusion, to obtain second stage features;

the second stage features are fused with a 8-fold down-sampled low quality face image by the third image fusion module, and are extracted by the third multi-scale state space module after fusion, to obtain third stage features;

wherein the decoder sequentially comprises a fourth multi-scale state space module, a first multi-scale attention fusion module, a fifth multi-scale state space module, a second multi-scale attention fusion module, a sixth multi-scale state space module, and a third multi-scale attention fusion module;

wherein the third stage features are restored by the fourth multi-scale state space module to obtain a 2-fold up-sampled restored face image;

the 2-fold up-sampled restored face image is fused with the first stage features, the second stage features and the third stage features by the first multi-scale attention fusion module, to obtain a 4-fold up-sampled restored face image by the fifth multi-scale state space module;

the 4-fold up-sampled restored face image is fused with the first stage features, the second stage features and the third stage features by the second multi-scale attention fusion module, to obtain the 8-fold up-sampled restored face image by the sixth multi-scale state space module; and the 8-fold up-sampled restored face image is fused with the first stage features, the second stage features and the third stage features by the third multi-scale attention fusion module, and is decoded after fusion to align and fit with an input low quality face image, to obtain a restored high quality face image; and wherein the first multi-scale state space module, the second multi-scale state space module, the third multi-scale state space module, the fourth multi-scale state space module, the fifth multi-scale state space module and the sixth multi-scale state space module have same network structures, each of which comprises a plurality of multi-scale state space models and a feature extraction unit, and each multi-scale state space model contains two state space branches, a dimension reduction unit, a first linear layer and a second linear layer, a layer normalization unit, and a dimension upgrading unit;

wherein each state space branch contains a depth-divisible convolution, a layer normalization unit, and a state space model;

an output of the first state space branch is summed with an output of the dimension reduction unit and then passes through the first linear layer and the second linear layer, respectively;

an output of the second state space branch is summed with an output of the dimension reduction unit, and then multiplied with an output of the second linear layer, added with the output of the first linear layer, and finally passes through the layer normalization unit to obtain a higher-dimensional output; and ability to extract long sequences of deep features of the state space model is used to enhance module feature mining and learning ability.

2. The method according to claim 1, wherein the first image fusion module, the second image fusion module and the third image fusion module have same network structures, and each of the first image fusion module, the second image fusion module and the third image fusion module comprises a 2-fold down-sampled unit, a feature extraction unit and a channel attention unit;

wherein low quality face images of different scales are input to be performed, by the channel attention unit, key feature fusion on shallow features mined by the feature extraction unit and deep features output by the encoder at different stages, to promote image pixels and semantic features to learn from each other.

3. The method according to claim 2, wherein the feature extraction unit comprises a residual convolution block and an activation function;

wherein the residual convolution block comprises two convolution layers and two activation functions, a modified linear function is used as the activation function, and output features obtained after the two convolution layers extracting deeper features from input features are summed with the input features to obtain final output features;

and/or, the channel attention unit comprises a dimension reduction unit, an attention mechanism operation for assigning weights to different channels, and a dimension upgrading unit.

4. The method according to claim 1, wherein each state space model comprises three linear layers, a convolution layer, two activation layers, and a selection state space model connected by residuals;

the first output branch of the layer normalization unit passes through the third linear layer, the convolution layer, the first activation layer, and the selection state space model in sequence to obtain the first feature; the second output branch of the layer normalization unit passes through the fourth linear layer and the second activation layer in sequence to obtain the second feature; the first feature and the second feature are connected in a residual manner and then output through the fifth linear layer;

an expression of the state space model is:

$$\begin{cases} x'(t) = Ax(t) + Bu(t) \\ y(t) = Cx(t) + Du(t) \end{cases}$$

wherein u(t) denotes an input signal, x(t) denotes a historical state, x'(t) denotes a current state, y(t) denotes an output signal; A denotes a state transfer matrix, B is a matrix of inputs to states, C is a matrix of states to outputs, and D is a parameter of inputs to outputs.

5. The method according to claim 4, wherein ordinary differential equations of the state space model are converted into discrete-time differential equations according to a bilinear transformation method by selecting a suitable discrete-time step $\Delta t$, the differential equations are:

$$\begin{cases} x_k = \overline{A}x_{k-1} + \overline{B}u_k \\ y_k = Cx_k \\ \overline{A} = (1 - \Delta t/2 \cdot A)^{-1}(I + \Delta t/2 \cdot A) \\ \overline{B} = (I - \Delta t/2 \cdot A)^{-1}\Delta t \cdot B \end{cases}$$

wherein $x_k$ denotes a current $K_{th}$ state, $U_K$ denotes a $K_{th}$ discrete value of an input sequence, $x_{k-1}$ denotes a $K-1_{th}$ historical state, and an affection $x_k$ of a current input $\overline{B}u_k$ on a state $\overline{A}x_{k-1}$ is calculated and an output $Cx_k$ is predicted; wherein $\overline{A}$ denotes a discretized state transfer matrix, $\overline{B}$ denotes a discretized input-to-state matrix;

the state space model is selectionly forgotten or retained by adjusting the step $\Delta t$ to control a focus of the state space model on the current input, to achieve a selection state space model.

6. The method according to claim 1, wherein the first multi-scale attention fusion module, the second multi-scale attention fusion module, and the third multi-scale attention fusion module have same network structures, each of which comprises a generalized interpolation unit, a 2-fold down-sampled unit, a local attention stage, and a global attention stage;

the first stage features, the second stage features and the third stage features output by the encoder are unified in sizes by the generalized interpolation unit, to keep consistent with a size of output features output currently by encoder at current stage which pass through the 2-fold down-sampled unit, and followed by fusion of local and global features by the local attention stage and global attention stage.

7. The method according to claim 6, wherein the 2-fold down-sampled unit comprises a pooling layer and a convolution layer, wherein the feature extraction unit comprises two residual convolution blocks and an activation function, wherein the channel attention unit comprises two residual convolution blocks and two activation functions;

wherein the generalized interpolation unit comprises an image fusion unit and a convolution layer, and the local attention stage comprises two residual convolution blocks and two activation functions, and the global attention stage contains a hourglass-shaped attention fusion unit and a channel attention unit.

8. The method according to claim 1, wherein a method of training a restoration model comprises:

obtaining a training set, wherein the training set comprises a public high quality face dataset simulating a real degradation process, generating a low quality face training image to be restored and a corresponding high quality face image;

inputting the low quality face training image to be restored into a state space restoration model, performing model training and obtaining a restored face training image in an iterative process;

calculating a restoration model loss function based on the restored face training image and a corresponding high quality face restored image; and iteratively updating the training of the restoration model based on a gradient descent method until it reaches an iterative stopping condition, to obtain a trained restoration model.

9. A face image restoration system based on a state space model, comprising a processor and a storage medium;

the storage medium is used to store instructions;

the processor for operating according to the instructions to perform the method according to claim 1.

* * * * *